Figure 1:
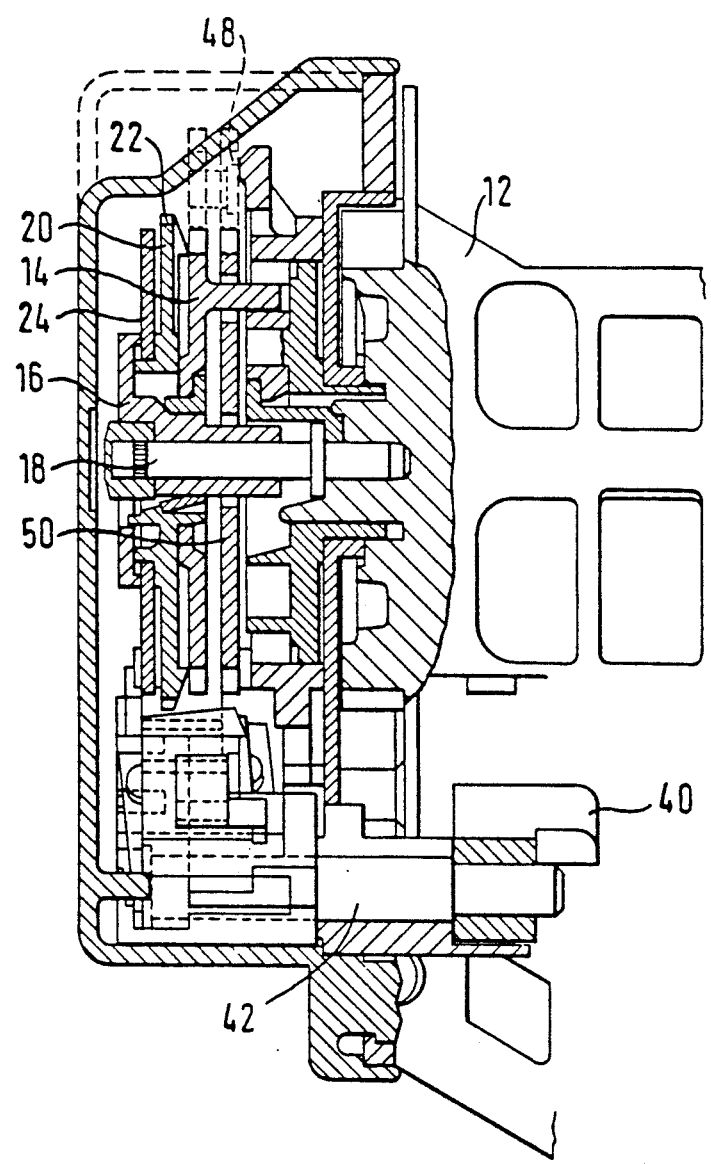

United States Patent

Kalbantner et al.

Patent Number: 5,169,085
Date of Patent: Dec. 8, 1992

[54] SAFETY BELT RETRACTOR WITH A VEHICLE-SENSITIVE AND WEBBING-SENSITIVE BLOCKING MECHANISM

[75] Inventors: Günter Kalbantner, Schwäbisch Gmünd-Lindach; Ralf Ebner, Gschwend, both of France; Robert Kopetzky, Mutlangen, Fed. Rep. of Germany

[73] Assignee: TRW Repa GmbH, Alfdorf, Fed. Rep. of Germany

[21] Appl. No.: 750,326

[22] Filed: Aug. 27, 1991

[30] Foreign Application Priority Data

Sep. 7, 1990 [EP] European Pat. Off. ......... 90117257

[51] Int. Cl.⁵ .................. B60R 22/38; B60R 22/40
[52] U.S. Cl. ..................... 242/107.4 A; 242/107.4 B
[58] Field of Search ............... 242/107.4 A, 107.4 B; 280/806; 297/478, 480

[56] References Cited

U.S. PATENT DOCUMENTS 4,993,656  2/1991  Tsuge et al. .............. 242/107.4 A
5,042,738  8/1991  Mori .................. 242/107.4 A X

FOREIGN PATENT DOCUMENTS 2826286  12/1979  Fed. Rep. of Germany.

*Primary Examiner*—John M. Jillions
*Attorney, Agent, or Firm*—Tarolli, Sundheim & Covell

[57] ABSTRACT

To avoid an undesirable locking of the belt spool on sudden taking up of a relatively great length of webbing on the belt spool, a means is provided which from a predetermined value of the external diameter of the webbing coil on the belt spool onwards prevents activation of the vehicle and webbing-sensitive blocking mechanism. This is achieved by means of a synchronization gear which is coupled non-rotatably to the belt spool and from a predetermined value of the external diameter of the webbing coil onwards comes into engagement with a coupling gear which simultaneously comes into engagement with an external toothing of a control disk, so that any relative movement between the control disk and the belt spool is prevented, thereby disabling activation of the blocking mechanism.

5 Claims, 2 Drawing Sheets

SAFETY BELT RETRACTOR WITH A VEHICLE-SENSITIVE AND WEBBING-SENSITIVE BLOCKING MECHANISM

The invention relates to a safety belt retractor with a vehicle-sensitive and webbing-sensitive blocking mechanism. A retractor of this type has a control disk with external teeth and mounted for limited relative rotation with respect to a spool whereon the webbing is coiled. The control disk has external teeth for cooperation with a pawl which, in turn, cooperates with an inertial mass such as a ball to be raised thereby into engagement with the teeth of the control disk and prevent rotation of the control disk. The blocking mechanism is activated by a predetermined relative rotation between the belt spool and the control disk, as is conventional in the field of safety belt retractors.

In rare cases in conventional safety belt retractors with webbing-sensitive blocking mechanisms undesirable blocking of the belt spool occurs. This effect can arise when a relatively long webbing portion withdrawn from the belt spool is suddenly released and is wound up onto the belt spool substantially unrestricted by frictional losses occurring in normal use. At the end of the coiling operation the webbing is subjected to a relatively high tension by the mass inertia of the belt spool and said tension causes the belt spool to turn back in the withdrawal direction with an acceleration high enough to cause the webbing-sensitive blocking mechanism to be activated.

The invention overcomes this problem with a minimum of additional expenditure.

According to the invention, the retractor is provided with a sensor which senses the external diameter of the belt coil on the belt spool. Adjacent the control disk a synchronization gear is provided which is connected non-rotatably to the belt spool. A coupling gear is provided having an external toothing matching the toothings of the control disk and the synchronization gear. The movement travel of the sensing element caused by the variable external diameter of the webbing coil is converted into a control movement by which the coupling gear from a predetermined value of the external diameter of the webbing coil onwards is brought into engagement both with the toothing of the control disk and with the toothing of the synchronization gear. As soon as the coupling gear is brought into engagement with the toothings of the control disk and of the synchronization gear, the control disk and the belt spool are coupled non-rotatably to each other so that no rotation of the control disk relative to the belt spool can take place. Since the blocking mechanism of the belt retractor can only be activated by a relative rotation between the belt spool and the control disk, with this non-rotatable coupling of control disk and belt spool no activation of the blocking mechanism can take place.

Since in the safety belt retractor according to the invention the undesired activation of the blocking mechanism is prevented by acting on the control disk and the latter is designed for small control forces, the forces to be exerted on the blocking mechanism to inactivate the latter may be very small. Since furthermore the control disk must execute a rotation relatively to the belt spool through a few angular degrees in order to activate the blocking mechanism, the rotational position in which said control disk is blocked relatively to the blocking spool is not critical. Consequently, no high demands as regards mechanical loadability and production or assembly accuracy are made on the conversion mechanism converting the travel movement of the sensing element sensing the webbing coil to an intervention movement of the coupling gear.

According to a particularly preferred embodiment the sensing element is formed as sensing lever pivotally mounted on the housing of the safety belt retractor; the coupling gear is rotatably mounted on a pivot lever pivotally mounted on the housing of the safety belt retractor. Furthermore, the sensing lever and the pivot lever are mounted pivotally about the same axis. The sensing lever and the pivot lever form the two arms of a two-armed lever which, however, are functionally and resiliently coupled to each other only from the predetermined external diameter of the webbing coil onwards. The direction of the travel stroke of the sensing lever on increasing diameter of the webbing coil, i.e. radially from the inside to the outside, is converted by the two-armed lever into an opposite radially inwardly directed movement of the coupling gear. The conversion mechanism is thus reduced to only two lever arms resiliently coupled to each other.

Further expedient embodiments of the invention will be apparent from the subsidiary claims.

Figure 2:
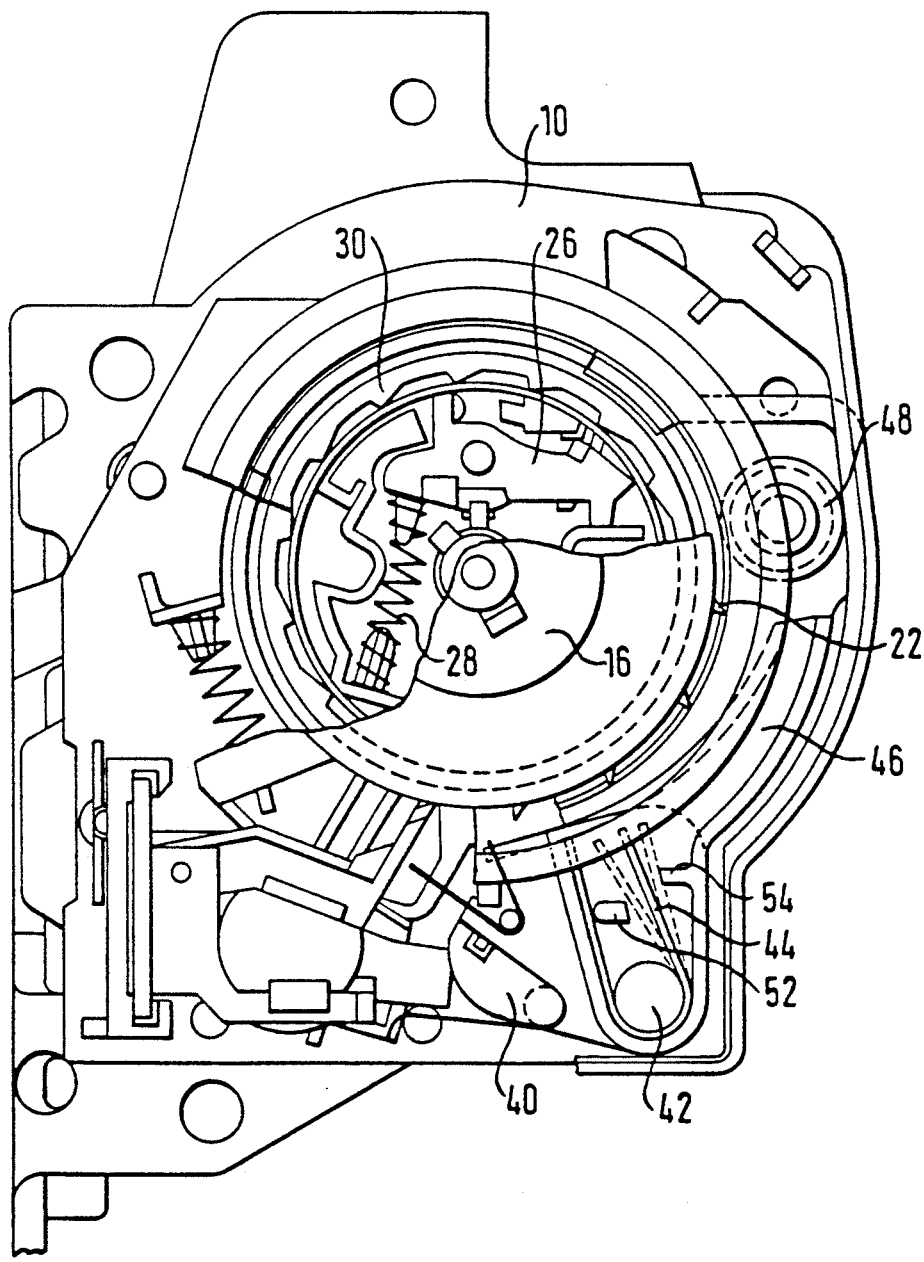

Further advantages and features of the invention will be apparent from the following description of an embodiment and from the drawings, to which reference is made. In the drawings:

FIG. 1 shows an axial partial section of the embodiment of the safety belt retractor; and FIG. 2 is a side elevation of the safety belt retractor shown in FIG. 1 with the control disk shown broken away.

A belt spool 12 for receiving the webbing is rotatably mounted in a loadbearing housing 10 of the safety belt retractor. The belt retractor is equipped with a blocking mechanism which blocks in an emergency and which is activatable both in a webbing-sensitive and in a vehicle-sensitive manner. The blocking mechanism is constructed in conventional manner and will therefore not be described in detail. The control mechanism for webbing-sensitive and vehicle-sensitive activation of the blocking mechanism includes a control disk 14 mounted rotatably on a bearing member 16 which is nonrotatably connected to the belt spool 12 by a pin 18. A control gear 20 provided with a control toothing 22 and a metal disk 24 acting as inert mass are coupled to the control disk 14. As apparent from FIG. 2, a pawl 26 is also pivotally mounted on the bearing member 16. The pawl 26, which is urged by a spring 28 into its rest position, cooperates with an internal toothing of a drive ring 30 by the rotational movement of which the blocking mechanism is activatable.

A control pawl cooperates in conventional manner with the control toothing 22 of the control gear 20 and by an inertia sensor is raised in vehicle-sensitive manner into the path of movement of the control teeth. On webbing withdrawal a relative rotation then occurs between the control disk 14 and the belt spool. This relative rotation is transmitted via a cam to the pawl 26 which then engages into the internal toothing of the drive ring 30 and couples the latter nonrotatably to the belt spool 12. Further webbing withdrawal therefore leads to rotation of the drive ring 30 and consequently to activation of the blocking mechanism. Rotation of the control disk 14 relatively to the belt webbing 12 also occurs however in a webbing-sensitive manner on sudden webbing withdrawal because the control disk 14 lags behind the rotational movement of the belt spool due to the metal disk 24 coupled thereto and the mass inertia thereof.

The configuration of the safety belt retractor described so far does not differ from conventional designs as described for example in DE-OS 2,826,286.

To prevent an undesired activation of the blocking mechanism on sudden taking up of the webbing, the safety belt retractor is provided with a means which prevents activation of the blocking mechanism after a predetermined value of the external diameter of the webbing coil on the belt spool 12 has been reached. Said means includes a sensing lever 40 which is pivotally mounted on a pin 42 and executes about said pin 42 a pivot travel following the external diameter of the webbing coil. Said sensing lever 40 is coupled by a leaf spring 44 resiliently to an arcuate pivot lever 46. Mounted freely rotatably at the free end of said pivot lever 46 is a coupling gear 48 consisting of two identical gears arranged in axial spaced relationship. Connected to the bearing member 16 is a synchronization gear 50, the external toothing of which lies opposite one of the two gears of the coupling gear 18. The other gear of the coupling gear 48 lies opposite an external toothing on the outer periphery of the control disk 14.

The sensing lever 40 forms with the pivot lever 46 also mounted on the pin 42 a two-armed lever, the arms of which are resiliently coupled to each other by a leaf spring 44. The pivot lever 46 is provided in the region of its bearing hub with two stops 52, 54 which are spaced apart and between which the free leg of the leaf spring 44 is movable.

By a radially outwardly directed pivot movement of the sensing lever 40 taking place from a predetermined value of the external diameter of the webbing coil onwards the pivot lever 46 is caused to effect a radially inwardly directed pivot movement by which the coupling gear 48 is brought into engagement both with the toothing of the synchronization gear 50 and with the toothing of the control disk 14. This state is shown in FIG. 1. By the coupling gear 48 the synchronization gear 50 and the control disk 14 are coupled nonrotatably to each other and to the belt spool 12. Consequently, no relative movement is possible between the control disk 14 and the belt spool and therefore no activation of the blocking mechanism can take place.

On decreasing external diameter of the belt webbing the sensing lever 40, which is biased resiliently against the webbing coil, is pivoted back radially inwardly, the pivot lever 46 thereby being pivoted radially outwardly until the coupling gear 48 is out of engagement with the synchronization gear 50 and the control disk 14. In this condition the blocking mechanism is again functionable in webbing-sensitive and vehicle-sensitive manner.

We claim:

1. A safety belt retractor for vehicles having a housing, a belt spool and a vehicle-sensitive and webbing-sensitive blocking mechanism which comprises:

a control disk having external teeth for cooperation with a pawl of an inertial sensor, said control disk being mounted for limited relative rotation with respect to said belt spool, and relative rotation between said control disk and said belt spool causing said blocking mechanism to be activated;

a synchronization gear fixed in rotation with said belt spool and having an external toothing;

an external toothing provided on the outer periphery of said control disk;

a webbing diameter sensor for sensing the outer diameter of webbing received on said belt spool; and a coupling gear operatively connected to said webbing diameter sensor so that, upon sensing of a predetermined external diameter of the webbing on said belt spool, said coupling gear is moved into meshing engagement with both external toothings of said control disk and said synchronization gear to lock said control disk and said synchronization gear fixed in rotation with respect to each other.

2. The safety belt retractor according to claim 1, wherein said webbing diameter sensor comprises a sensing lever pivotally mounted on said retractor housing, said coupling gear being rotatably mounted on a pivot lever pivotally mounted on said housing, the sensing lever and the pivot lever being pivotal about the same axis, and the sensing lever and the pivot lever forming functionally two arms of a two-armed lever, the arms of which are caused to be resiliently coupled to each other from said predetermined external diameter of the webbing onwards.

3. The safety belt retractor according to claim 2, wherein said resilient coupling between the sensing lever and the pivot lever is effected by a leaf spring which is fixedly connected at its one end to the sensing lever and at its other end is movable between two spaced apart stops on the pivot lever.

4. The safety belt retractor according to claim 2, wherein said sensing lever is loaded resiliently against the external diameter of the webbing coiled on said spool.

5. The safety belt retractor according to claim 1, wherein said coupling gear is formed as double gear having two gears of the same outer diameter rigidly connected to each other.

* * * * *